United States Patent Office 3,632,744
Patented Jan. 4, 1972

3,632,744
OIL AND WATER REPELLENT
COSMETIC POWDER
Duane Owen Paulsen, Wilmington, Del., assignor to E. I. du Pont de Nemours and Company, Wilmington, Del.
No Drawing. Filed Dec. 17, 1969, Ser. No. 886,015
Int. Cl. A61k 7/02
U.S. Cl. 424—69  6 Claims

ABSTRACT OF THE DISCLOSURE

An oil and water repellent cosmetic powder comprising a powder substrate having thereon a composition selected from the group consisting of (a) A polyfluoroalkylphosphate salt having the formula
$$[C_mF_{2m+1}C_nH_{2n}O]_yPO(OM)_{3-y}$$
where $n$ is an integer of from 1 to 16, $m$ is an integer of from 4 to 14, and $C_m$ and $C_n$ together contain a straight chain of at least 8 carbon atoms; $y$ is a number of average value from 1.0 to 2.5 and M is a water solubilizing cation from the group including H, alkali metal, and ammonium or substituted ammonium, (b)
$$C_8F_{17}-SO_2-\underset{\underset{C_2H_5}{|}}{N}-CH_2COOM$$

wherein M is an alkali metal, ammonium or substituted ammonium, (c) A copolymer derived from the following monomers in the weight percent range shown 75% to 98% by weight of units derived from monomers of structure $R_fCH_2CH_2O_2CCH=CH_2$ wherein $R_f$ is a perfluoroalkyl group of from four to fourteen carbons;
25% to 2% by weight of units derived from monomers selected from the group consisting of (1) $ROCH=CH_2$ wherein R is selected from $$X(CF_2)_nCH_2-$$

X being F or H and $n$ one or two, and $(CF_3)_2CH$, and
(2) $R'OCF=CF_2$ wherein R' is selected from R, as defined above, and $F(CF_2)_m-$, $m$ being from one to three; and 0% to 5% by weight of units derived from monomers selected from the class consisting of (1) $CH_2=CR^2CONHR^3OH$ and
(2) $CH_2=CR^2CO_2R^4OH$
(3) $CH_2=CR^2CO_2R^5$ wherein $R^2$ is H or $CH_3$, $R^3$ is an alkylene group of from one to about four carbons, $R^4$ is an alkylene group of from two to about four carbons and $R^5$ is epoxyalkyl of at least three carbons; or
(4) Mixtures of the above.
(d) The compond $$C_8F_{17}-SO_2N-CH_2CH_2-O\underset{\underset{C_3H_7}{|}}{C}-\underset{\underset{CH_3}{|}}{\overset{\overset{OH}{|}}{C}}-CH_2-S-CH_2-\underset{\underset{CH_3}{|}}{\overset{\overset{H\ O}{|\ ||}}{C}}-C-O(CH_2CH_2O)_4H$$

and
(e) A copolymer derived from the following monomers in the amounts shown
192 parts $F(CF_2)_nCH_2CH_2O_2CC(CH_3)=CH_2$ where $n=6$, 8 and 10 in the weight ratio 3:2:1 and also containing trace amounts of $n=12$ and 14
48 parts of n-butyl methacrylate and
12 parts glycidyl methacrylate.

strate having thereon a composition selected from the group consisting of (a) A polyfluoroalkylphosphate salt having the formula $[C_mF_{2m+1}C_nH_{2n}O]_yPO(OM)_{3-y}$ where $n$ is an integer of from 1 to 16, $m$ is an integer of from 4 to 14, and $C_m$ and $C_n$ together contain a straight chain of at least 8 carbon atoms; $y$ is a number of average value from 1.0 to 2.5 and M is a water solubilizing cation from the group including H, alkali metal, and ammonium or substituted ammonium, (b)
$$C_8F_{17}-SO_2-\underset{\underset{C_2H_5}{|}}{N}-CH_2COOM$$

wherein M is an alkali metal, ammonium or substituted ammonium, (c) A copolymer derived from the following monomers in the weight percent range shown 75% to 98% by weight of units derived from monomers of structure $R_fCH_2CH_2O_2CCH=CH_2$ wherein $R_f$ is a perfluoroalkyl group of from four to fourteen carbons;
25% to 2% by weight of units derived from monomers selected from the group consisting of (1) $ROCH=CH_2$ wherein R is selected from $$X(CF_2)_nCH_2-$$

X being F or H and $n$ one or two, and $(CF_3)_2CH$, and
(2) $R'OCF=CF_2$ wherein R' is selected from R, as defined above, and $F(CF_2)_m-$, $m$ being from one to three; and 0% to 5% by weight of units derived from monomers selected from the class consisting of (1) $CH_2=CR^2CONHR^3OH$ and
(2) $CH_2=CR^2CO_2R^4OH$
(3) $CH_2=CR^2CO_2R^5$ wherein $R^2$ is H or $CH_3$, $R^3$ is an alkylene group of from one to about four carbons, $R^4$ is an alkylene group of from two to about four carbons and $R^5$ is epoxyalkyl of at least three carbons; or
(4) Mixtures of the above.
(d) The compound $$C_8F_{17}-SO_2N-CH_2CH_2-O\underset{\underset{C_3H_7}{|}}{C}-\underset{\underset{CH_3}{|}}{\overset{\overset{OH}{|}}{C}}-CH_2-S-CH_2-\underset{\underset{CH_3}{|}}{\overset{\overset{H\ O}{|\ ||}}{C}}-C-O(CH_2CH_2O)_4H$$

and
$R^4$ is an alkylene group of from two to about four carbons
(e) A copolymer derived from the following monomers in the amounts shown
192 parts $F(CF_2)_nCH_2CH_2O_2CC(CH_3)=CH_2$ where $n=6$, 8 and 10 in the weight ratio 3:2:1 and also containing trace amounts of $n=12$ and 14
48 parts of n-butyl methacrylate and
12 parts glycidyl methacrylate.

This novel cosmetic powder possesses desirable properties of oil and water repellency which make it particularly useful to individuals.

DESCRIPTION OF THE PRIOR ART

A desired quality of cosmetic powders is that they maintain a consistent hue and shade in use for a relatively long period of time. Individuals today expect their cosmetic powders to keep an attractively smooth, unmarred appearance for several hours or more. One factor which works against this performance is the natural oil exuded from the skin, which, when taken up by the cosmetic powder, tends to darken the color, causing an undesirable, uneven appearance. Likewise water or other liquid either in the form of perspiration or from outside

BACKGROUND OF THE INVENTION

Field of the invention

A novel cosmetic powder comprising a powder subphysical contact will cause a change of color and a blotchy appearance if it wets the powder surface.

A variety of chemical agents are presently used to confer oil and water repellency on various substrates. The widest use of such repellents is found in the textile filed where resistance to water, oil and stains has long been sought. Much work has also been done in conferring oil repellency on paper and paperboard used for wrapping food or commercial articles of an oily nature.

It has now been discovered that treatment of cosmetic powder substrates with oil and water repellent compositions which are presently utilized in the treatment of paper, textiles and the like will effect a noticeable improvement in the oil and water repellency of these cosmetic powder substrates. The overall result is a novel cosmetic powder which manifests improvement in resistance to change of shade when contacted with oil and/or water.

SUMMARY OF THE INVENTION

The present invention is directed to a cosmetic powder comprising a powder substrate having thereon a composition which imparts thereto the desirable properties of oil and water repellency. The composition which may be found on the substrate is selected from (a) A polyfluoroalkylphosphate salt having the formula $[C_mF_{2m+1}C_nH_{2n}O]_yPO(OM)_{3-y}$ where $n$ is an integer of from 1 to 16, $m$ is an integer of from 4 to 14, and $C_m$ and $C_n$ together contain a straight chain of at least 8 carbon atoms; $y$ is a number of average value from 1.0 to 2.5 and M is a water solubilizing cation from the group including H, alkali metal, and ammonium or substituted ammonium, (b)

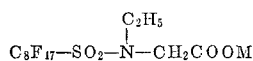

wherein M is an alkali metal, ammonium or subsittuted ammonium, (c) A copolymer derived from the following monomers in the weight percent range shown 75% to 98% by weight of units derived from monomers of structure $R_fCH_2CH_2O_2CCH=CH_2$ wherein $R_f$ is a perfluoroalkyl group of from four to fourteen carbons; 25% to 2% by weight of units derived from monomers selected from the group consisting of (1) ROCH=$CH_2$ wherein R is selected from

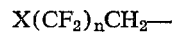

X being F or H and $n$ one or two, and $(CF_3)_2CH$, and (2) R'OCF=$CF_2$ wherein R' is selected from R, as defined above, and $F(CF_2)_m-$, $m$ being from one to three; and 0% to 5% by weight of units derived from monomers selected from the class consisting of (1) $CH_2=CR^2CONHR^3OH$ and
(2) $CH_2=CR^2CO_2R^4OH$
(3) $CH_2=CR^2CO_2R^5$ wherein $R^2$ is H or $CH_3$, $R^3$ is an alkylene group of from one to about four carbons, $R^4$ is an alkylene group of from two to about four carbons and $R^5$ is epoxyalkyl of at least three carbons; or
(4) Mixtures of the above.
(d) The compound

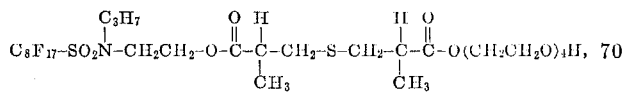

and (e) A copolymer derived from the following monomers in the amounts shown 192 parts $F(CF_2)_nCH_2CH_2O_2CC(CH_3)=CH_2$ where $n=$ 6, 8 and 10 in the weight ratio 3:2:1 and also containing trace amounts of $n=12$ and 14

48 parts of n-butyl methacrylate and 12 parts glycidyl methacrylate.

DESCRIPTION OF THE INVENTION

The cosmetic powder substrates utilized in the present invention are generally composed of insoluble inorganic mineral products such as talc, kaolin, titanium dioxide and the like; pigments for coloring purposes; and other additives utilized to confer specific properties, such as magnesium stearate to improve the feel or slip, and perfume. The powder should pass through a screen of at least 300 mesh to the inch. The major ingredient in most cosmetic powder substrates is talc, which is usually present to at least 50% of the total weight of the substrate and may constitute up to 90 or 95% of that weight.

A typical face powder substrate formula would include:

| Ingredient: | Percent by weight |
|---|---|
| Kaolin | 3.0 |
| Talc | 74.0 |
| Magnesium stearate | 1.5 |
| Magnesium carbonate | 0.5 |
| Zinc oxide | 15.0 |
| Coloring matter | 5.0 |
| Perfume | 1.0 |
| | 100.0 |

The treatment disclosed in this invention can be applied directly to the talc, kaolin, titanium dioxide or chalk, or to the blended mineral components of the powder substrate with equal facility. Experiments have shown that in the case of some commercial powder substrates, even the perfume of the powder substrate persists through the treatment.

The resultant treated cosmetic powders of the invention should pass at least 98% through a 325 mesh screen. The pH of the powder in water is between 5.0 and 8.5. These powders are non-irritating on normal skin, however caution must be prescribed for their use on sensitive skin.

Various compositions possess the ability to repel oil or water. For the treatment of the above-discussed cosmetic powder substrate, however, is was desired that both oil and water repellency be imparted simultaneously thereon and at the same time the composition utilized should attach to the powder substrate in such a manner that it would not be easily removed through use. The powder substrates were consequently treated with the following compositions which were found to be particularly effective in producing all of the desired properties and effects in the novel treated cosmetic powders of this invention. Polyfluoroalkylphosphate salts of general formula

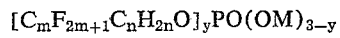

where $n$ is an integer of from 1 to 16, $m$ is an integer of from 4 to 14, and $C_m$ and $C_n$ together contain a straight chain of at least 8 carbon atoms; $y$ is a number of average value from 1.0 to 2.5 and M is a water solubilizing cation from the group including H, alkali metal, and ammonium or substituted ammonium were found to be useful. A preferred example of this group is about an equimolecular mixture of the compounds:

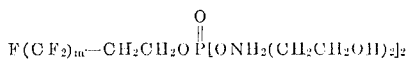

and

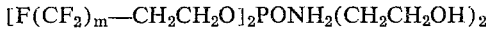

where $m=6$ to 14.

These compositions may be prepared according to U.S. Pat. 3,083,224. They are fairly soluble and can be readily applied to many substrate materials, talc among them.

These compositions are generally handled and sold in solutions containing about ⅓ fluorophosphate active ingredient, ⅓ water and ⅓ isopropyl alcohol.

The preferred method for applying these polyfluoroalkylphosphates to the cosmetic powder substrate is to first prepare a 0.25% solution of the active ingredient in deionized water, then to thoroughly mix the solution with an equal weight of predried powder substrate at room temperature. Free water and treated powder are separated by filtration and the wet powder substrate cake is dried in an air oven at about 105° C. The dry treated cosmetic powder is then screened through a brass screen having 60 mesh to the inch to remove any possible agglomerates. The treated cosmetic powder is then ready to test for shade retention, and for blending with another powder substrate if desired.

The free acid forms of these compounds, as opposed to the metallic salts, are soluble in solvents such as methyl, ethyl and isopropyl alcohol, and can be applied to talc from such solutions.

In addition to these polyfluoroalkylphosphate salts, other useful compositions are represented by the formula $C_8F_{17}—SO_2—N(R)—R'—COOM$ where R is an alkyl group of from 1 to 4 carbon atoms and M is an alkali metal, ammonium or substituted ammonium. Preparation of these compositions is described in U.S. Pat. 2,809,990. They may likewise be applied to powder substrate from an aqueous 0.25% solution, using a 1:1 ratio of solution of powder substrate, the dry talc being mixed with an equal weight of the solution, then filtered and the cake dried as described previously.

Another useful oil and water repellent composition is represented by copolymers containing 75% to 98% by weight of units derived from monomers of structure $R_fCH_2CH_2O_2CCH=CH_2$ wherein $R_f$ is a perfluoroalkyl group of from four to fourteen carbons;

25% to 2% by weight of units derived from monomers selected from the group consisting of (1) $ROCH=CH_2$ wherein R is selected from $$X(CF_2)_nCH_2—$$

X being F or H and n one or two, and $(CF_3)_2CH$, and (2) $R'OCF=CF_2$ wherein R' is selected from R, as defined above, and $F(CF_2)_m—$, m being from one to three; and 0% to 5% by weight of units derived from monomers selected from the class consisting of (1) $CH_2=CR^2CONHR^3OH$ and
(2) $CH_2=CR^2CO_2R^4OH$
(3) $CH_2=CR^2CO_2R^5$ wherein $R^2$ is H or $CH_3$, $R^3$ is an alkylene group of from one to about four carbons, $R^4$ is an alkylene group of from two to about four carbons and $R^5$ is epoxyalkyl of at least three carbons; or
(4) Mixtures of the above.

These compositions, which may be prepared as in Example 4, are produced and sold as aqueous emulsions containing 5-10% active ingredient. A 0.25% aqueous preparation of the active ingredient solids may be used for treatment of the powder substrate in the same manner as already described.

Also discovered to be useful is the compound

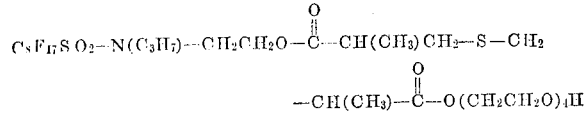

prepared by reacting $$C_8F_{17}—SO_2—N(C_3H_7)—CH_2CH_2OH$$

with 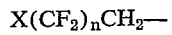 yielding

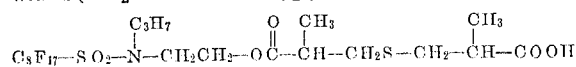

then adding 4 moles of ethylene oxide to give the final product. This water soluble material may likewise be applied to the powder substrate in 0.25% solution as described previously.

Yet another water and oil repellent composition used successfully is the copolymeric composition derived from the following monomers in the amounts shown 192 parts $F(CF_2)_nCH_2CH_2O_2CC(CH_3)=CH_2$ where n= 6, 8 and 10 in the weight ratio 3:2:1 and also containing trace amounts of n=12 and 14
48 parts of n-butyl methacrylate and
12 parts glycidyl methacrylate.

Preparation of this composition is fully described in U.S. Pat. 3,459,696. It may be applied to powder the substrate from a 0.25% solution in $CCl_2F—CF_2Cl$ at a 1:1 ratio of solution to powder substrate in the manner described previously.

As may be observed from the examples, the effectiveness of the recommended compositions may vary somewhat. The method of application, in which solutions or suspensions of the compositions in their available form was used provided active fluorine containing ingredient contents in the treating composition of from 0.5% down to .005%. All in this range were useful, and while active ingredient contents greater than 0.5% are possible, further testing indicated that an upper effective limit of treatment could be reached. When the treating composition contained more than about 1.0% of active ingredient, little further improvement in oil or water repellency was observed in the treated cosmetic powder.

After treatment with these compositions, the treated cosmetic powder should have attached thereon from about .004% to 0.4% fluorine present in the form of these compositions.

EXAMPLES

The following examples are intended to be merely illustrative of the invention and not in limitation thereof. Unless otherwise indicated, all quantities are on a weight basis.

The oil repellency test used in the determination of the results of the Examples 1–10 to measure the resistance of a substrate to wetting by organic liquids was the following: Drops of fluid hydrocarbons of various surface tensions were placed, at uniform temperature and without impact, on a surface. Beginning with the lowest numbered test liquid, drops were carefully placed at several spots on the test surface. If no wetting occurred, a drop of the next higher numbered liquid was placed at several adjacent sites on the substrate and again observed at definite time intervals. This procedure was continued until one of the test liquids penetrated and discolored the substrate during the set time period. The oil repellency rating was the number of the highest numbered test liquid which did not wet for the period noted. The test oils used are listed below:

AATCC TENTATIVE TEST METHOD 18–1966 T

| Oil component: | Rating No. |
|---|---|
| Mineral oil | 1 |
| 65/35 mineral oil/n-hexadecane | 2 |
| n-Hexadecane | 3 |
| n-Tetradecane | 4 |
| n-Dodecane | 5 |
| n-Decane | 6 |
| n-Octane | 7 |
| n-Heptane | 8 |

The higher the number rating, the more effective was the oil repellency, and the better the shade retention. For testing powders, degrees of repellency were subclassified as follows:

Share Maintained—Drop was light in color as was the interface of liquid and solid Slightly Dark—Drop was still standing with a pronounced contact angle, but a slight discoloration was noted at the interface of liquid and solid Dark—The powder was dark at the interface even though there was still a drop standing, usually with a lower contact angle Wet—The drop had penetrated and there was a dark spot on the otherwise light colored powder Evaporated—Higher numbered oils (or water) were sufficiently volatile to have evaporated over the time of the test, without wetting.

Water repellency was tested separately by using a drop of dionized water as test liquid with the above grading scheme.

Control samples of untreated talc had water repellency rated Shade Maintained at 5 minutes and wet at 10 minutes. Oil repellency was graded wet at 0 minutes with Rating No. 1 test liquid.

However, simply washing the talc with water and drying gave some improvement in both oil and water repellency. Water repellency rating was slightly dark at 30 minutes and wet at 1 hour. Oil repellency test was graded Shade Maintained at 1 minute with test liquid Rating No. 1 and slightly dark with test liquid Rating No. 2. Both graded wet at 30 minutes. Presumably water washing removed some material in the raw talc which had provided a wetting action.

The talc used in the tests of Examples 1–7 was "Emtal" 43, obtainable from Eastern Magnesia Talc Co., Inc., P.O. Box 445, Burlington, Vt. 05401. It had the following tpyical properties and analysis:

"EMTAL"—43 [1]

Physical properties

| | |
|---|---|
| 200 mesh (percent) | 99.84 |
| 325 mesh (percent) | 98.32 |
| Color percent reflectance (photo-volt) | 71.5 |
| Oil absorption (raw lin. oil) | 30.8 |
| pH | 9.8 |
| Specific gravity | 2.94 |
| Bulk-loose-lbs./cu.ft. | 43.0 |
| Bulk-packed-lbs./cu.ft. | 75.6 |

[1] Analysis of typical production sample.

"EMTAL"-43 [1]
Chemical properties

| | Percent | Percent |
|---|---|---|
| Magnesium oxide (MgO) | 34.19 | |
| Silicon dioxide (SiO$_2$) | 31.54 | |
| Calcium oxide (CaO) | 0.65 | |
| Iron oxide (Fe$_2$O$_3$) | 7.07 | |
| Aluminum oxide (Al$_2$O$_3$) | 0.81 | |
| Manganese oxide (MnO) | 0.114 | |
| Sodium oxide (Na$_2$O) | 0.08 | |
| Acid soluble iron oxide (Fe$_2$O$_3$) | | 5.04 |
| Potassium oxide (K$_2$O) | | <0.01 |
| Carbon dioxide (CO$_2$) | | 22.64 |
| Loss on ignition | 25.27 | |
| Total | 99.724 | |
| Total MgO SiO$_2$ CaO (TT-P-403A) | 66.38 | |

[1] Analysis of typical production sample.

EXAMPLE 1

Preparation of polyfluoroalkyl phosphates (a) Pentafluoroiodoethane was prepared by reacting tetrafluoroethylene and iodine as described in Example 1 of U.S. Pat. 3,283,020.

(b) The pentafluoroiodoethane thus prepared was then reacted with tetrafluoroethylene using the method of Parsons, U.S. Pat. 3,234,294 and yield a mixture of compounds of formula $F(CF_2)_nI$ where $n$ is an integer of 6 to 14. The mixture had an average molecular weight of about 597.

(c) The fluoroiodides of (b) above were reacted in autoclave with ethylene in the weight ratio of 17 parts fluoroiodide and 1 part ethylene. The reaction was carried out at 195° C., the pressure in the autoclave being increased during the course of the reaction from 50 lbs./in.$^2$ to 200 lbs./in.$^2$. After all of the ethylene had been added to the autoclave, the temperature of 195° C. was maintained for 10 hours, and 200 lbs./in.$^2$ pressure was maintained by adding additional ethylene. The reaction mass was then cooled to about 55° C. and the product discharged. This product was a mixture of fluoroiodides of general formula $F(CF_2)_nCH_2CH_2I$ where $n$ was an integer of 6 to 14. The average molecular weight was about 625.

(d) The mixed fluoroiodides were next reacted with oleum followed by hydrolysis as describd in U.S. Pat. 3,283,012. The product was a mixture of alcohols of general formula $F(CF_2)_nCH_2CH_2OH$ where $n$ was 6 to 14. The chief components of the alcohol mixture were those alcohols wherein $n=6$ (35–40%), $n=8$ (30–35%) and $n=10$ (15–18%). Average molecular weight was about 454.

(e) The mixture of polyfluoroalkylalcohols was reacted with phosphoric anhydride (3 moles alcohol to 1 mole phosphoric anhydride) at 80° C. After the anhydride had been slowly added to the dry alcohol, the temperature was raised to 90° C. and held for about 20 hours. The mixture was then cooled by an external cooling means to 70° C. and anhydrous isopropyl alcohol was then added (about 7 moles to each 3 moles of the starting alcohol) to reduce the viscosity and permit ready transfer and handling. The mixture was then diluted with about 110 moles of water for each 3 moles of starting alcohol, and the acidity neutralized with diethanolamine. A little more than 3 moles per mole of starting phosphoric anhydride will normally be required. The product was then further diluted with isopropyl alcohol and was homogenized by agitating vigorously at 70° C. After cooling to 30° C. by an external cooling means CCl$_2$FCF$_2$Cl was added (about 1 mole per mole of starting alcohol) to aid in maintaining a uniform solution. The material is usually diluted with water to about 33% solids for ease in handling. The solid material product, which was the active oil and water repellent ingredient, had the formula

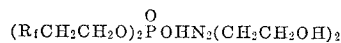

wherein $R_f = C_6F_{13}$ to $C_{14}F_{29}$.

The mixture contained about equal molar amounts of the mono(fluoroalkyl) and di(fluoroalkyl) compounds.

EXAMPLE 2

About 0.25 gram of the solids prepared in Example 1 of this specification was dissolved in deionized water to make 100 grams of solution. In a 400 ml. beaker 100 grams of talc was mixed with the solution at room temperature until the talc was completely wet out. The slurry was filtered using a Buchner funnel and flask with a paper filter at about 20″ (Hg) vacuum. The wet talc cake was dried in an air oven at 105° C. and screened through a brass screen having 60 mesh to the inch to eliminate any possible agglomerates. Fluorine content of the resultant treated and dried talc powder was 0.08%, equal to about 0.15% fluoroalkyl phosphate active ingredient. A pile of the loose powder was poured onto a flat ceramic plate and a notched draw bar drawn over the talc, leaving a flat surface on a pile about ¼″ high. The talc was tested for oil repellency and water repellency as previously described with the following results:

Water repellency: Shade maintained after 3 hours—no darkening or wetting. Test water evaporated after 5 hours, with no wetting.

Oil repellency: Test Liquid No. 5 (n-dodecane) was repelled with no darkening or wetting after 5 hours. Test Liquid No. 6 (n-decane) wet immediately.

When the above experiment was repeated using 0.50 gram of the product mixture of Example 1 of this specification, the dried, treated talc contained about 0.2% fluorine equivalent to about 0.36% fluoroalkyl phosphate active ingredient. Water repellency: Shade maintained after 3 hours—no darkening or wetting. Test water evaporated after 5 hours, with no wetting. Oil repellency: Test Liquid No. 5 (n-dodecane) was repelled with no darkening or wetting after 8 hours. Test Liquid No. 6 (n-decane) showed wetting after 5 minutes.

EXAMPLE 3

The compound $C_8F_{17}$—$SO_2$—$N(C_2H_5)CH_2COONa$ which was prepared according to Example 1 of U.S. Pat. 2,809,990 was dissolved in deionized water to make a 0.25% solution. When this solution was used to treat talc as described in Example 2 above, the following repellency tests were obtained: Water repellency: Shade maintained after 5 minutes, slightly dark after 10 minutes, dark after 15 minutes, wet after 30 minutes. Oil repellency: Test Liquid No. 2 (65/35 mineral oil/n-hexadecane) slightly dark immediately. Dark after 3 minutes. Test Liquid No. 3 (n-hexadecane)—wet immediately.

EXAMPLE 4

A composition comprising a 7% aqueous emulsion of a copolymer which comprised units of the monomers shown as follows in the weight percents shown:

|  | Percent |
| --- | --- |
| $F(CF_2)_6CH_2CH_2O_2CCH=CH_2$ | 96.5 |
| $CF_3CH_2OCH=CH_2$ | 2.75 |
| $CH_2=CHCONHCH_2OH$ | 0.25 |
| $CH_2=C(CH_3)CO_2CH_2CH_2OH$ | 0.25 | was used to make a 0.25% suspension of the composition in deionized water. The copolymer was prepared in the following manner:

A dispersion of 144 parts $$F(CF_2)_6CH_2CH_2O_2CCH=CH_2$$

16 parts of a 50% aqueous solution of octadecyltrimethyl ammonium chloride and 80 parts water was prepared, then diluted with 48 parts further water. The dispersion was purged with nitrogen for 30 min., then 0.095 part 2-hydroxyethyl methacrylate and 0.145 part 60% aqueous N-methylolacrylamide were added and purged for an additional 30 min. Then 16 parts trifluoroethyl vinyl ether were added and the resulting mixture was added to 300 parts further water. While maintaining the mass under a slight positive nitrogen pressure and under an efficient reflux condenser, the temperature of the mass was raised to 65° C. and 0.32 part azobis(isobutyramidine)dihydrochloride was added. Further like additions of azo compound were made after 20 and 60 minutes, after which the mass was maintained at 65–70° C. for eight hours.

The resulting polymer latex contained 25.52 parts polymer per 100 parts latex, corresponding to a 96.4% monomer conversion. A sample of dried polymer had an inherent viscosity of 0.70 as a 0.5% solution in trichlorotrifluoroethane at 30° C. Nuclear magnetic resonance spectrographic analysis of a hexafluorobenzene solution of the polymer indicated it contained 2.75% by weight trifluoroethyl vinyl ether. This was followed by diluting the resultant latex with water until the amount of copolymer was 7% by weight. Talc was then treated with this composition in the same manner as described in Example 2 of this specification and the fluorine content of the treated, dried talc was 0.11%, equal to about 0.17% of the above polyfluoroactive ingredient composition. The following oil and water repellent test results were obtained: Water repellency: Shade maintained after 2½ hours. Evaporated after 3 hours, with no wetting. Oil repellency: Test Liquid No. 3 (n-hexadecane)—Shade maintained after 2½ hours, slightly dark after 8 hours.

Test Liquid No. 4 (n-tetradecane), slightly dark immediately, dark after 8 hours.

EXAMPLE 5

A repellent composition was prepared as in Example 1 of this specification, except that dimethylaminopropylamine was used for neutralization instead of the diethanolamine used in that example. When talc was treated as in Example 2 with this composition, the following repellent tests results were obtained: Water repellency: Shade maintained after 1½ hours, evaporated after 2 hours. Oil repellency: Test Liquid No. 2 (65/35 mineral oil/n-hexadecane)—Shade maintained after 24 hours; Test Liquid No. 3 (n-hexadecane)—shade maintained after 15 minutes, slightly dark after 20 minutes.

Flourine content of the treated, dried talc was 0.12% equal to about 0.22% of the fluoroalkyl phosphate active ingredient.

When the free acid from (unneutralized) of the Example 1 composition as a 0.25% solution in isopropyl alcohol was used to treat talc, the treated talc being filtered and dried as before, similarly good test results were obtained: Water repellency: Shade maintained after 3 hours, evaporated after 5 hours, with no wetting. Oil repellency: No. 3 (n-hexadecane) test liquid—Shade maintained after 5 hours.

EXAMPLE 6

A 0.25% solution in deionized water was made of the commercial repellent "Scotchgard" 216, obtainable from Minnesota Mining and Manufacturing Co., Minneapolis, Minn.

An analysis of "Scotchgard" 216 was undertaken and the principal active ingredient component was believed to be

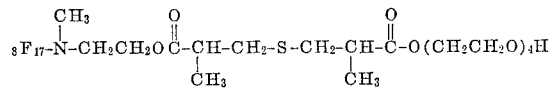

This compound probably provides about 70% of the active ingredient content, while the compound

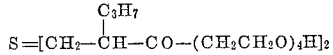

makes up the remaining 30%. There is present also a small amount (about 3%) of a polymer material derived from the monomer

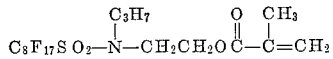

The active ingredient content of the commercial "Scotchgard" 216 is about 30%. The remainder of the product is water containing a small amount (2–4%) of ethyl acetate. The latex is dispersed with a small amount of a cationic surfactant. Talc was treated with this solution as in Example 2, with the following repellent tests results: Water repellency: Shade maintained after two hours, evaporated after 2½ hours, with no wetting. Oil repellency: Test Liquid No. 2 (65/35 mineral oil/n-hexadecane)—Shade maintained after eight hours. Test Liquid No. 3 (n-hexadecane)—dark immediately.

The treated, dried talc contained 0.08% fluorine equal to about 0.25% of fluorine containing active ingredient.

EXAMPLE 7

A copolymeric water and oil repellent composition was prepared as in Example 1, Part 1 of U.S. Pat. 3,459,969, whereby a copolymer was formed from 192.0 parts of $F(CF_2)_nCH_2CH_2O_2CC(CH_3)=CH_2$ wherein $n=6$, 8 and 10 in the weight ratio 3:2:1 and containing trace amounts of $n=12$ and 14, 48.0 parts of n-butyl methacrylate, and 12.0 parts of glycidyl methacrylate. After polymerization and isolation, a 0.25% solution of this composition in $CCl_2F$—$CF_2Cl$ was prepared. About 100 grams of talc was treated with 100 grams of this solution as in Example 2 of this specification, and the treated talc was dried. Upon testing for repellency, the following results were obtained: Water repellency: Shade maintained after 3 hours, evaporated after 5 hours. Oil repellency: Test Liquid No. 2 (65/35 mineral oil/n-hexadecane)—Shade maintained after 1½ hours; wet after 2 hours.

The foregoing Examples 1–7 clearly illustrate a variety of polyfluoro compounds within the scope of this invention which are useful in treating cosmetic powder to confer water and oil repellency thereto and to preserve the cosmetic powder against discoloration from wetting. Both monomeric and polymeric compounds which are water and solvent soluble and emulsions of said polymers have been tested and the results shown.

EXAMPLE 8

A powder of the following composition was prepared:

| | Percent by weight |
|---|---|
| Zinc oxide (Mallinckrodt) | 20 |
| Talc ("Emtal" 43—Eastern Magnesia Talc Co.) | 61 |
| Zinc stearate ("Aero" 23 USP—American Cyanamide Co.) | 5 |
| Kaolin (Fisher Laboratories) | 10 |
| Titanium Dioxide ("Ti Pure" R–931—Du Pont) | 3 |

The constituents were well mixed using a roller mill, and a sample was treated with the repellent composition of Example 1 of this specification. Into a 400 ml. beaker were placed 100 ml. of water, 1 gram of the repellent composition of said Example 1 and 100 grams of the powder composition prepared above. The mixture was stirred for 10 minutes at room temperature, then the solid was filtered on a suction funnel and dried in an oven at 100° C. When tested, 98% of a sample of the dry powder passed through a 325 mesh screen. The powder was tested for shade maintenance by oil and water repellency and the following results were obtained: Water repellency: No darkening or wetting after 3 hours exposure, evaporated after 4 hours. Test Liquid No. 5 (n-dodecane) was repelled with no darkening or wetting after 1 hour; Test Liquid No. 4 (n-tetradecane) showed no darkening or wetting after 8 hours.

When this powder was applied to the human face, it was quite satisfactory as regards smoothness and evenness of apperance over a period of 4 hours or more.

Untreated powder tested for oil and water repellency darkened immediately when exposed to water, and showed slight darkening immediately with Test Liquid No. 1 (mineral oil) in the oil repellency test.

EXAMPLE 9

A sample of kaolin was treated with the repellent composition of Example 1 of this specification in the same manner as in Example 8 preceding except that an additional 100 ml. of water was added to the slurry of powder, water and repellent to provide a less viscous, more easily stirred mix. The dried, repellent-treated kaolin was tested for shade retention by oil repellency and water repellency tests and the following results were obtained: Water repellency: Shade maintained for 2 hours. Oil repellency: Slight darkening after exposure to Test Liquid No. 1 (mineral oil) for 30 minutes.

Untreated kaolin showed immediate darkening and wetting with both water and Test Liquid No. 1 (mineral oil).

EXAMPLE 10

Titanium dioxide was treated with the repellent composition of Example 1 of this specification in the same manner as used for kaolin in Example 9 preceding. Darkening and wetting were immediate with both water and Test Liquid No. 1 (mineral oil).

When the experiment was repeated but with the amount of repellent increased from 1 gram to 5 grams, the treated, dried titanium dioxide showed no darkening after 8 hours exposure to Test Liquid No. 2 (65/35 mineral oil/n-hexadecane) and slight darkening after 30 minutes exposure to Test Liquid No. 3 (n-hexadecane). There was no darkening after 6 hours water exposure, The foregoing detailed description has been given for clearness of understanding only and no unnecessary limitations are to be understood therefrom. The invention is not limited to the exact details shown and described, for obvious modifications will occur to those skilled in the art.

The embodiments of the invention in which an exclusive property or privilege is claimed are defined as follows:

1. A cosmetic powder which can pass at least 98% through a 325 mesh to the inch screen, said cosmetic powder comprising a pigmented powder carrier which can pass through a 300 mesh to the inch screen, said carrier being selected from the group consisting of talc, kaolin, titanium dioxide, chalk, and blends thereof and said carrier having thereon from about .004% to 0.4% by weight of fluorine in the form of an oil and water repellent compound selected from the group consisting of (a) a polyfluoroalkylphosphate salt having the formula 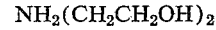 where $n$ is an integer of from 1 to 16, $m$ is an integer of from 4 to 14, and $C_m$ and $C_n$ together contain a straight chain of at least 8 carbon atoms; $y$ is a number of average value from 1.0 to 2.5 and M is a water solubilizing cation selected from the group consisting of H, alkali metal, ammonium or $$NH_2(CH_2CH_2OH)_2$$

(b)

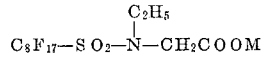

wherein M is selected from the group consisting of alkali metal, ammonium or $NH_2(CH_2CH_2OH)_2$, (c) a copolymer derived from the following monomers in the weight percent range shown 75% to 98% by weight of units derived from monomers of structure $$R_fCH_2CH_2O_2CCH=CH_2$$

wherein $R_f$ is a perfluoroalkyl group of from four to fourteen carbons;

25% to 2% by weight of units derived from monomers selected from the group consisting of (1) ROCH=CH$_2$ wherein R is selected from $X(CF_2)_nCH_2-$, X being F or H and $n$ one or two, and $(CF_3)_2CH$, and (2) R'OCF=CF$_2$ wherein R' is selected from R, as defined above, and $F(CF_2)_m-$, $m$ being from one to three; and 0% to 5% by weight of units derived from monomers selected from the group consisting of (1) $CH_2=CR^2CONHR^3OH$ and (2) $CH_2=CR^2CO_2R^4OH$ (3) $CH_2=CR^2CO_2R^5$ wherein $R^2$ is H or $CH_3$, $R^3$ is an alkylene group of from one to about four carbons, $R^4$ is an alkylene group of from two to about four carbons and $R^5$ is epoxyalkyl of at least three carbons; or (4) mixtures of the above, (d) the compound

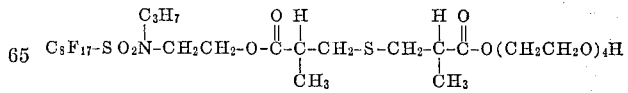

and (e) a copolymer derived from the following monomers in the amounts shown 192 parts $F(CF_2)_nCH_2CH_2O_2CC(CH_3)=CH_2$ where $n=6$, 8 and 10 in the weight ratio 3:2:1 and also containing trace amounts of $n=12$ and 14

48 parts of n-butyl methacrylate and 12 parts glycidyl methacrylate.

2. A cosmetic powder according to claim 1 wherein the compound is a mixture of the compounds

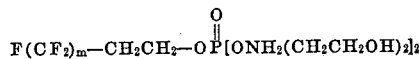

and

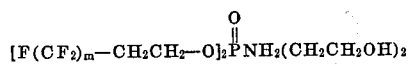

wherein $m=6$ to 14, each of said compounds being present in about equimolecular amounts.

3. A cosmetic powder according to claim 1 wherein the compound is a copolymer derived from the following monomers in the weight percents shown 96.5 percent $F(CF_2)_6CH_2CH_2O_2CC$—$CH$=$CH_2$
2.75 percent $CF_3CH_2OCH$=$CH_2$
0.25 percent $CH_2$=$CHCONHCH_2OH$
0.25 percent $CH$=$C(CH_3)CO_2CH_2CH_2OH$.

4. A cosmetic powder according to claim 1 wherein the compound is

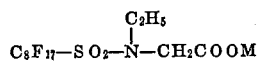

wherein M is selected from the group consisting of alkali metal, ammonium or $NH_2(CH_2CH_2OH)_2$.

5. A cosmetic powder according to claim 1 wherein the compound is the compound

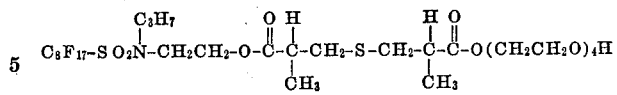

6. A cosmetic powder according to claim 1 wherein the compound is a copolymer derived from the following monomers in the amounts shown:

192 parts $F(CF_2)_nCH_2CH_2O_2CC(CH_3)$=$CH_2$ where $n=6$, 8 and 10 in the weight ratio 3:2:1 and also containing trace amounts of $n=12$ and 14
48 parts of n-butyl methacrylate and
12 parts glycidyl methacrylate.

References Cited
UNITED STATES PATENTS

| | | | |
|---|---|---|---|
| 1,707,684 | 4/1929 | Picker | 424—69 X |
| 2,749,277 | 6/1956 | Toulmin, Jr. | 424—69 X |

STANLEY J. FRIEDMAN, Primary Examiner

D. R. ORE, Assistant Examiner

U.S. Cl. X.R.

252—316